Dec. 26, 1944.  C. AILES, JR  2,365,989
MOUNTING DEVICE
Filed Dec. 31, 1943  2 Sheets-Sheet 1

Inventor:
Curtis Ailes Jr.,
by Harry E. Dunham
His Attorney.

Dec. 26, 1944.  C. AILES, JR  2,365,989
MOUNTING DEVICE
Filed Dec. 31, 1943  2 Sheets-Sheet 2

Inventor:
Curtis Ailes Jr.,
by Harry E. Dunham
His Attorney.

Patented Dec. 26, 1944

2,365,989

UNITED STATES PATENT OFFICE 2,365,989

MOUNTING DEVICE

Curtis Ailes, Jr., Schenectady, N. Y., assignor to General Electric Company, a corporation of New York Application December 31, 1943, Serial No. 516,342

14 Claims. (Cl. 248—358)

My invention relates to mounting devices and particularly to a construction which provides for a resilient support of the supported device for a predetermined amplitude of substantially free oscillation and for a damping of the oscillations beyond this predetermined amplitude.

An object of my invention is to provide an improved mounting device.

Another object of my invention is to provide an improved mounting device having a predetermined amplitude of substantially free oscillation and providing a frictional damping of oscillations beyond this predetermined amplitude of oscillations.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
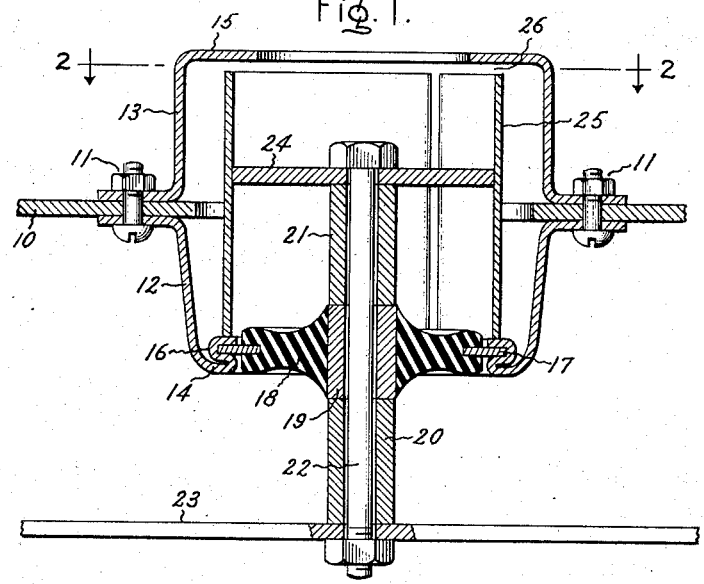
Figure 2:
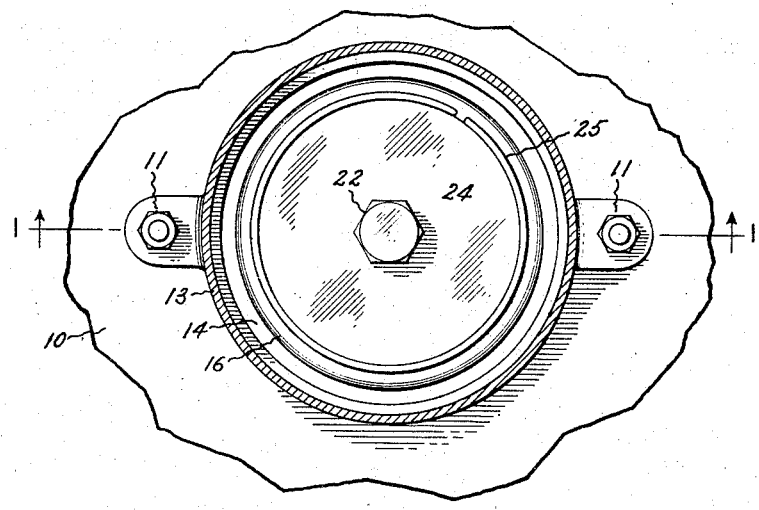
Figure 3:
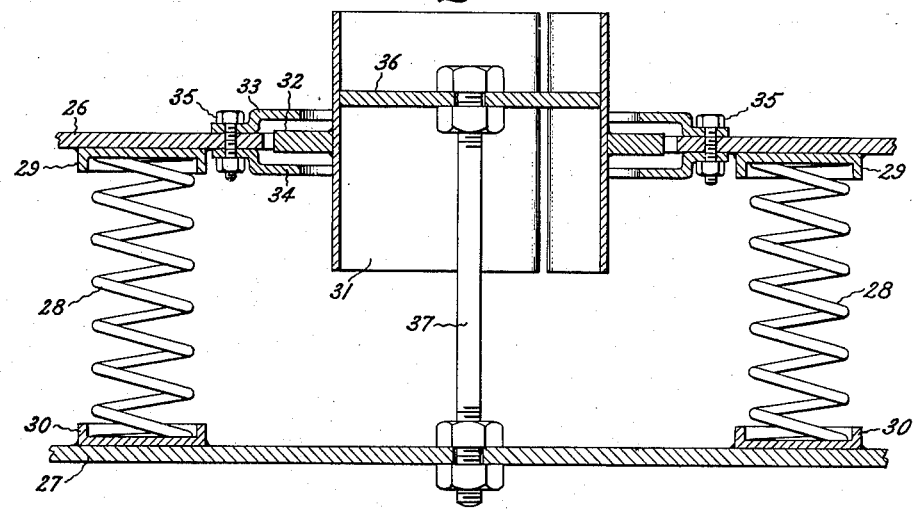
Figure 4:
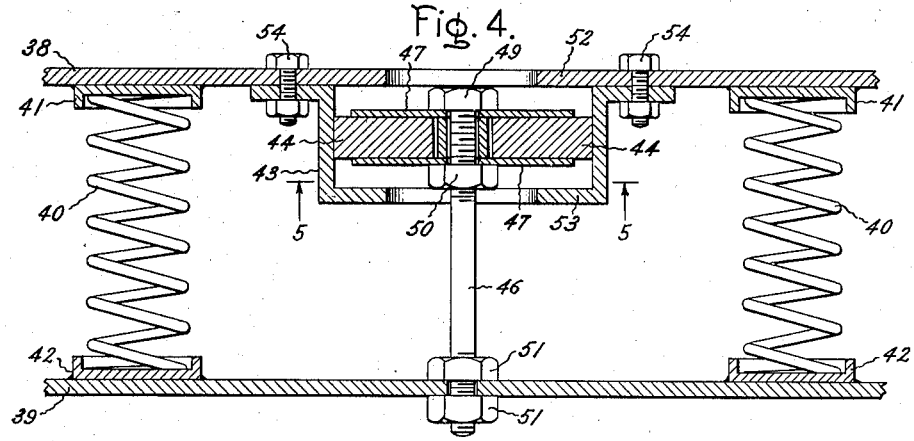

In the drawings, Fig. 1 is a sectional elevational view of an embodiment of my invention taken along line 1—1 of Fig. 2; Fig. 2 is a sectional plan view taken along line 2—2 of Fig. 1; Fig. 3 is a sectional elevational view of another embodiment of my improved mounting device; Fig. 4 is a sectional elevational view of a further embodiment of my invention; and Fig. 5 is a sectional view taken along line 5—5 of Fig. 4.

Referring to Figs. 1 and 2 of the drawings, I have shown an embodiment of my improved mounting device in which a support member 10 of either the supporting or supported device is secured by bolts 11 to a casing formed of two elements 12 and 13 extending in opposite directions from the support member 10. The ends 14 and 15 of the casing members 12 and 13, respectively, are turned in and form stops for friction damping elements which are mounted within the casing. The end 14 of the casing is formed with a reentrant or return bent 16 arranged in tight frictional engagement about the outer end of an annular metal element 17 about the inner end of which a resilient element 18 of suitable resilient material, such as rubber, is molded and bonded. This resilient element 18 is also molded about and bonded to a central support formed of a rigid tubular metal element 19 which is arranged between a pair of sleeves 20 and 21 which are held in assembled relationship by a through bolt 22 which extends through the sleeves 21 and the central member 19. This through bolt also extends through an opening in a support member 23 which may be secured to the supported or supporting member which is adapted to be secured to the support member 10. The other end of the bolt extends through an opening in a friction damping piston 24 and rigidly secures the piston 24 to the support member 23 through the bolt 22, the sleeves 20 and 21, and the central member 19. This provides for a resilient mounting connection between the support members 10 and 23. In certain instances, it is desirable that the amount of substantially free oscillation of the support members relative to each other be limited to a predetermined amplitude to prevent destructive vibrations. In order to limit this substantially free oscillation in a resilient support of this type, I provide a friction damping construction by arranging a split cylindrical spring element 25 of relatively smaller diameter than the piston 24 about the outer edge of the piston 24. This spring element 25 is spread to the diameter of the piston 24 and is fitted about the piston with a clamping frictional engagement and is arranged within the casing between the casing ends 14 and 15 with a predetermined clearance 26 between the ends of the cylindrical spring and the casing ends. These ends form longitudinally spaced apart stops for providing the desired predetermined amplitude of substantially free oscillation of the cylindrical spring 25 and its associated elements including the central rigid member 19 relative to the casing and restrains relative movement of the outer spring member relative to the support member 10. This construction provides a frictional damping of oscillations by relative movement of the inner member including the piston 24 within the cylindrical spring 25 on engagement of the cylindrical spring with either of the casing stops 14 and 15 when the central member 19 tends to move beyond the predetermined substantially free amplitude of oscillation provided by the clearance 26, and thereby dampens and prevents the transmission of destructive vibrations between the support members 10 and 23.

In Fig. 3 I have shown another embodiment of my invention in which my improved mounting device is shown in connection with a support member 26 of either the supporting or supported device. This support member 26 is resiliently mounted on a second support member 27 by a pair of compression coil spring 28 arranged between spring seats 29 on the support member 26 and spring seats 30 on the support member 27. The mounting device includes a friction damper formed of a resilient split cylindrical spring member 31 provided with a split annular stop ring 32 arranged between a pair of stop rings 33 and 34 which are secured by bolts 35 to the support member 26. This cylindrical spring member 31 is formed as the outer member of a friction damper and is arranged in clamping frictional engagement about the outer peripheral surface of an inner piston member 36 which is secured by a rod 37 to the second support member 27 in such a manner that oscillations between the support members 26 and 27 are damped by relative movement of the piston 36 within the spring member 31 when the stop ring 32 of the spring member 31 engages either of the stop rings 33 or 34. It has been found desirable to permit a predetermined amplitude of substantially free oscillation without any damping by the friction damper. This is provided by arranging a predetermined amount of clearance between the stops 33 and 34 on the support member 26 and the stop ring 32 on the outer spring member 31, so as to provide the desired free movement of the damper relative to the support member 26 and for restraining movement of the outer spring member 31 relative to the piston 36 and the support member 27 to a predetermined desired amount.

Figure 5:
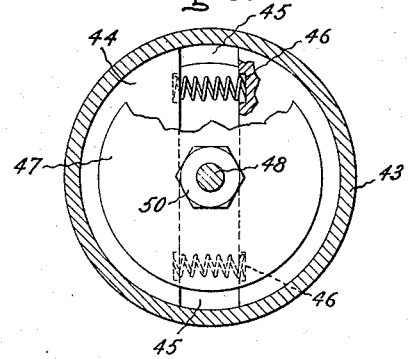

In Figs. 4 and 5 I have shown a further modification of my improved mounting device in which a support member 38 is arranged to be resiliently supported on a second support member 39 by a pair of resilient compression coil springs 40 arranged between spring seats 41 on the support member 38 and spring seats 42 on the support member 39. A friction damping device is provided which includes an outer cylindrical member 43 secured to the support member 38 by a plurality of bolts 54 and arranged about a split inner piston member formed of two segments 44 resiliently biased apart by compression coil springs 45 arranged between spring seats formed by pockets 46 in the two piston segments 44. This arrangement provides for a resilient frictional engagement between the piston segments 44 and the outer member 43, so that a clamping frictional pressure is provided between these members. The segments 44 are held in their desired relative relationship by a pair of retaining plates 47 arranged on each side of the segments 44 and are secured to a rod 48 between a bolt head 49 on the rod and a nut 50 which permits relative movement of the piston segments 44 about the bolt and provides for adjustment thereof due to the springs 45. The piston member is secured to the support member 39 by a pair of nuts 51 which fasten the rod 48 to this support member. In some constructions, it is desired to limit the relative movement between support members, and in this embodiment of my invention, an arrangement is provided for limiting the relative movement between the support members 38 and 39. This is obtained by a pair of stops formed by an extension 52 of the support member 38 and an inturned annular flange 53 formed on the lower end of the outer cylindrical member 43 which limits the amplitude of travel of the piston member within the outer cylindrical member 43. In this arrangement, frictional damping is provided by the inner piston member within the outer cylindrical member for all relative movements between the two support members 38 and 39 within the limits of travel of the piston member within the cylindrical member, and a rigid support is provided between the two support members through the piston and one or the other of the stops 52 or 53 whenever there is a tendency to produce a relative movement between the support members 38 and 39 greater than the limits of travel between the piston member and the cylindrical member.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A mounting device for a support member including a resilient member mounted on said support member and on a second support member providing a resilient connection therebetween, and a friction damping means including an inner member and an outer member arranged in clamping frictional engagement about said inner member for providing a friction damping of oscillations by relative movement of said inner member within said outer member, means for restraining relative movement of said outer member relative to one of said support members, and means for connecting said inner member to the other of said support members.

2. A mounting device including a casing with stops adjacent the ends thereof, means for mounting said casing on a support member, a piston, means for providing a resilient connection between said casing and said piston, means for mounting said piston on a second support member, and a friction damping means including a split cylindrical spring element fitted about said piston with a frictional engagement and arranged within said casing with a predetermined clearance between said spring and said casing stops for providing a friction damping of oscillations by relative movement of said piston within said cylindrical spring on engagement of said cylindrical spring with said casing stops.

3. A mounting device including a substantially rigid casing with stops adjacent the ends thereof, means for mounting said casing on a support member, a central substantially rigid member, means for providing a resilient connection between said casing and said central member, a piston, means for mounting said piston on said central member and on a second support member, and a friction damping means including a split cylindrical spring element fitted about said piston with a frictional engagement and arranged within said casing with a predetermined clearance between said spring and said casing stops for providing a friction damping of oscillations by relative movement of said piston within said cylindrical spring on engagement of said cylindrical spring with said casing stops.

4. A mounting device including a casing with inturned ends forming stops, means for securing said casing to a support member, a central member, means including a resilient member secured to said casing and to said central member for providing a resilient connection therebetween, a piston, means for securing said piston to said central member and to a second support member, and a split cylindrical spring element fitted about said piston with a clamping frictional engagement and arranged within said casing with a predetermined clearance between said spring and said casing stops for providing a friction damping of oscillations by relative movement of said piston within said cylindrical spring on engagement of said cylindrical spring with said casing stops.

5. A mounting device including a substantially rigid casing with inturned ends forming stops, means for securing said casing to a support member, a central substantially rigid member, means for providing a resilient connection between said casing and said central member, a piston, means for securing said piston to said central member and to a second support member, and a friction damping means including a split cylindrical element fitted about said piston with a frictional engagement and arranged within said casing with a predetermined clearance between said spring and said casing stops for providing a predetermined amplitude of substantially free oscillation of said cylindrical spring and central member relative to said casing and a friction damping of oscillations by relative movement of said piston within said cylindrical spring on engagement of said cylindrical spring with said casing stops beyond said predetermined substantially free oscillation amplitude.

6. A mounting device including a casing with stops adjacent the ends thereof, means for securing said casing to a support member, a central member, means including a resilient member secured to said casing and to said central member for providing a resilient connection therebetween, a piston, means for securing said piston to said central member and to a second support member, and a friction damping means including a cylindrical spring element fitted about said piston with a frictional engagement and arranged within said casing with a predetermined clearance between said spring and said casing stops for providing a predetermined amplitude of substantially free oscillation of said cylindrical spring and central member relative to said casing and a friction damping of oscillations by relative movement of said piston within said cylindrical spring on engagement of said cylindrical spring with said casing stops beyond said predetermined substantially free oscillation amplitude.

7. A mounting device including a substantially rigid casing with inturned ends forming stops, means for securing said casing to a support member, a central substantially rigid member, means including a resilient rubber member secured to said casing and to said central member for providing a resilient connection therebetween, a piston, means for securing said piston to said central member and to a second support member, and a friction damping means including a split cylindrical spring element fitted about said piston with a clamping frictional engagement and arranged within said casing with a predetermined clearance between said spring and said casing stops for providing a predetermined amplitude of substantially free oscillation of said cylindrical spring and central member relative to said casing and a friction damping of oscillations by relative movement of said piston within said cylindrical spring on engagement of said cylindrical spring with said casing stops beyond said predetermined substantially free oscillation amplitude.

8. A mounting device for a support member including spaced apart stops secured to said support member, a piston, means including a resilient member secured to said support member and to said piston for providing a resilient connection therebetween, means for securing said piston to a second support member, and a friction damping means including a spring element fitted about said piston with a clamping frictional engagement with a predetermined clearance between said spring and said stops for providing a friction damping of oscillations by relative movement of said piston within said spring on engagement of said spring with said stops.

9. A mounting device for a support member including spaced apart stops secured to said support member, an inner piston member, means for securing said piston member to a second support member, means including a resilient member for supporting one of said support members on the other of said support members, and a friction damping means including an outer spring member adapted to engage said stops and fitted about said inner piston member with a clamping frictional engagement for providing a friction damping of oscillations by relative movement of said inner piston member within said outer spring member on engagement of said outer spring member with said stops.

10. A mounting device for a support member including a friction damping means having an inner member and an outer member arranged about said inner member for providing a friction damping of oscillations by relative movement of said inner member within said outer member, said inner member being arranged in frictional clamping engagement in said outer member to provide an outward force biasing the adjacent surfaces thereof together, means for restraining movement of said outer member relative to said support member, means for connecting said inner member to a second support member, and means for resiliently supporting one of said support members on the other of said support members.

11. A mounting device for a support member including spaced apart stops secured to said support member, a friction damping means including an inner member and an outer member arranged about said inner member for providing a friction damping of oscillations by relative movement of said inner member within said outer member, said inner member being arranged in frictional clamping engagement within said outer member to provide a force biasing the adjacent surfaces thereof together, means including said stops for restraining movement of said outer member relative to said support member to a predetermined amount, means for connecting said inner member to a second support member, and means for resiliently supporting one of said support members on the other of said support members.

12. A mounting device for a support member including a resilient member mounted on said support member and on a second support member providing a resilient support for one of said support members on the other, and a friction damping means including an inner member and an outer member arranged about said inner member for providing a friction damping of oscillations by relative movement of said inner member within said outer member, said inner member being arranged in frictional clamping engagement in said outer member to provide an outward force biasing the adjacent surfaces thereof together, means for restraining movement of said outer member relative to one of said support members, and means for connecting said inner member to the other of said support members.

13. A mounting device for a support member including spaced apart stops secured to said support member, a piston, means for securing said piston to a second support member, means including a resilient member for supporting one of said support members on the other of said support members, and a friction damping means including a spring element fitted about said piston with a clamping frictional engagement with a predetermined clearance between said spring and said stops for providing a friction damping of oscillations by relative movement of said piston within said spring on engagement of said spring with said stops.

14. A mounting device including a casing with spaced apart stops, means for securing said casing to a support member, a piston, means including a resilient member secured to said casing and to said piston for providing a resilient connection therebetween, means for securing said piston to a second support member, and a friction damping means including a spring element fitted about said piston with a clamping frictional engagement and arranged within said casing with a predetermined clearance between said spring and said casing stops for providing a friction damping of oscillations by relative movement of said piston within said spring on engagement of said spring with said casing stops.

CURTIS AILES, JR.